United States Patent [19]

Brunner

[11] Patent Number: 5,492,258
[45] Date of Patent: Feb. 20, 1996

[54] CROSS SUPPORT FOR ROOF LOADS ON A MOTOR VEHICLE PROVIDED WITH ROOF RAILINGS

[75] Inventor: Harald Brunner, Solingen, Germany

[73] Assignee: Gebr. Happich GmbH, Wuppertal, Germany

[21] Appl. No.: 287,845

[22] Filed: Aug. 9, 1994

[30] Foreign Application Priority Data

Oct. 8, 1993 [DE] Germany ..................... 43 34 331.7

[51] Int. Cl.⁶ .................................................. B60R 9/00
[52] U.S. Cl. ...................... 224/321; 224/315; 224/322; 224/331; 248/316.2
[58] Field of Search ........................... 224/309, 315, 224/319, 321, 322, 323, 329, 330, 331; 248/316.2, 316.5; 24/513, 516; 403/DIG. 4, DIG. 8, 373, 374, 110

[56] References Cited

U.S. PATENT DOCUMENTS

| | | | |
|---|---|---|---|
| 2,749,875 | 6/1956 | Frees et al. | 24/513 |
| 3,064,868 | 11/1962 | Treydte | 224/322 |
| 3,270,994 | 9/1966 | Machan et al. | 248/316.5 |
| 3,837,547 | 9/1974 | Joos | 224/331 |
| 3,920,167 | 11/1975 | Parsons | 224/323 |
| 4,406,386 | 9/1983 | Rasor et al. | 224/321 |
| 4,449,656 | 5/1984 | Wouden | 224/331 |
| 4,500,020 | 2/1985 | Rasor | 224/321 |
| 4,528,768 | 7/1985 | Anderson | 403/374 |
| 4,848,112 | 7/1989 | Graber et al. | 224/315 |
| 4,982,886 | 1/1991 | Cucheran | 224/321 |
| 5,004,139 | 4/1991 | Storm et al. | 224/331 |
| 5,118,156 | 6/1992 | Richard | 224/331 |
| 5,161,762 | 11/1992 | Stewart et al. | 403/373 |
| 5,232,138 | 8/1993 | Cucheran . | |
| 5,275,320 | 1/1994 | Duemmler | 224/321 |
| 5,385,285 | 1/1995 | Cucheran et al. | 224/321 |

FOREIGN PATENT DOCUMENTS

| | | | |
|---|---|---|---|
| 8136129 | 12/1981 | Germany . | |
| 8229914 | 10/1982 | Germany . | |
| 3510805 | 3/1985 | Germany . | |
| 4108058 | 3/1991 | Germany . | |
| 4001546 | 7/1991 | Germany | 224/331 |
| 37044 | 3/1992 | Japan | 224/315 |
| 352583 | 4/1961 | Switzerland | 224/331 |
| 1171382 | 8/1985 | U.S.S.R. . | |
| 690148 | 4/1953 | United Kingdom | 224/331 |
| 2218062 | 3/1989 | United Kingdom . | |

Primary Examiner—William A. Cuchlinski, Jr.
Assistant Examiner—Gregory M. Vidovich
Attorney, Agent, or Firm—Ostrolenk, Faber, Gerb & Soffen

[57] ABSTRACT

A cross support for extending between the roof rails on a motor vehicle roof, and having a detachable clamping device for clamping to the railing tube. The clamping device includes a stationary resting jaw and a clamping jaw movable toward the resting jaw. The clamping jaw has a yoke for engaging the railing tube and has an attack surface on the opposite side of the pivot from the yoke. A swing lever is pivotably supported on the cross support and is swingable between positions where it locks the clamping jaw in the clamping position and where it releases the clamping jaw. The clamping jaw and the swing lever are on respective spaced apart pivots.

20 Claims, 6 Drawing Sheets

CROSS SUPPORT FOR ROOF LOADS ON A MOTOR VEHICLE PROVIDED WITH ROOF RAILINGS

BACKGROUND OF THE INVENTION

1. Field of the Invention

The present invention relates to a cross support for roof loads on a motor vehicle provided with a roof railing, wherein the support extends from one longitudinally extending railing tube to the other and is provided at each end region with a detachable clamping device for attachment to a railing tube. Each clamping device has a resting jaw and a clamping jaw which is movable relative to the resting jaw. A jaw part of the clamping jaw is developed as a yoke which partly surrounds the associated railing tube so as to hold the cross support upon fastening on the clamping device.

2. Description of the Related Art

A cross support of this type is known from Federal Republic of Germany Patent Publication 41 08 058 C1. That known roof luggage carrier includes cooperating resting jaws and clamping jaws provided as fastening means. The resting jaws lie on the side of the respective railing tube that is toward the center of the vehicle and are fastened on the cross support. The clamping jaws lie on the side of the railing tube that is toward the outside of the vehicle and are seated displaceably on the cross support by means of a clamping screw bolt. By tightening the clamping screw bolts, the displaceable clamping jaws are pulled against the railing tubes and toward the resting jaws. This connects the cross support to the railing tubes.

However, it has been found that the clamping devices provided in known cross supports do not satisfy technical requirements. One disadvantage is that the jaws cannot be used for railing tube cross sections of any desired shape but must instead be adapted to the cross section of the specific railing tube. Another disadvantage is that the clamping force obtainable is not always sufficient to dependably hold the cross support on the railing tubes. This is because the unfavorable lever ratio of the clamping screw bolts with respect to the active jaw regions on the railing tubes does not permit optimal transmission of force. Experimentation has shown that, upon tightening of the clamping screw bolts, a relatively large bending moment is exerted on them as a result of the unfavorable lever ratios. This may jam and cant the displaceable clamping jaw. As a result, the clamping force transmitted to the clamping screw bolts is only in part applied as the clamping force acting on the railing tubes. Finally, operation of the clamping devices provided on the known cross supports is extremely cumbersome.

SUMMARY OF THE INVENTION

The present invention is a cross support of the above type such that, on the one hand, it is possible to connect the cross support to any desired shape profiled cross sections of the railing tubes and, on the other hand, the clamping devices of the support assure optimal transmission of force which is necessary for dependably holding the cross support on the railing tubes, and, finally, such that simple and rapid operation of the clamping devices is enabled.

According to the invention, the clamping jaw is mounted swingably and can be swung against the corresponding railing tube and locked to it by manually swinging a swing lever.

The invention provides a force closing system in addition to a quick clamping operation. This makes use of a tool unnecessary. In particular, this allows a railing tube to always be provided with support between the clamping elements at three points, regardless of the cross section of the railing tube.

According to a further feature of the invention, the clamping jaw is developed as a double armed lever which is swingable about a horizontally aligned pivot pin, the jaw including a lower lever arm as a bow part and an upper lever arm which has an attack surface for cooperating with a clamping projection which is fastened fixed to rotate with the swing lever and is capable of sliding along the attack surface upon actuation of the swing lever. The attack surface of the upper lever arm of the clamping jaw extends in an arcuate shape which corresponds approximately to the axis of swing of the clamping cam, but has a spiral curvature.

As another feature of the invention, the resting jaw is part of a base member which can be fastened to the cross support. The clamping jaw and the swing lever are also mounted to the base member on pivot pins which are spaced from but are aligned parallel to each other. In this way, the entire quick clamping mechanism comprises a single unit that is ready for mounting.

In a preferred embodiment of the invention, a transmission bracket is movably arranged on the pivot pin of the swing lever. The bracket bears against the clamping jaw. The swing position of the transmission bracket is determined and then locked by a setting member. In this setting a basic position for adaptation to small or large rail profiles and therefore reducing or increasing of the clamping opening can be effected rapidly and simply.

The setting member for the bracket may comprise a threaded nut fastened to the bracket and a headed screw which is guided displaceably in the nut and rests on the base member. In order to avoid use of a tool, a setting knob is arranged in a grip-favorable manner on the cross support to be drivingly coupled with the screw.

Unintended or unauthorized operation of the swing lever is prevented by providing the swing lever with a cylinder lock having a closing bolt.

Other features and advantages of the invention are described with reference to one embodiment of the invention explained below with reference to the drawings.

DESCRIPTION OF A PREFERRED EMBODIMENT

Figure 1:
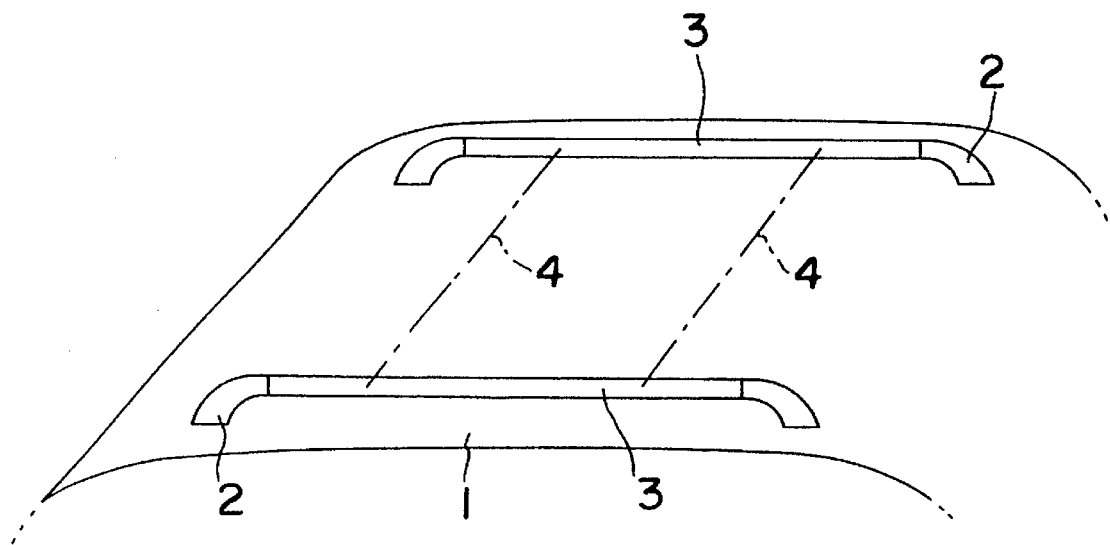
FIG. 1 shows a roof railing with cross supports, on the roof of a vehicle.

FIG. 1 shows the conventional metal roof of a vehicle (not further shown) with a roof luggage carrier arranged on the roof. The roof luggage carrier is comprised of two rails, each including support feet 2 and a railing tube 3, and cross supports 4 which are indicated only in dash-dot line, that are fastened to the railing tubes 3. The rails extend at least approximately parallel to each other and in the longitudinal direction of the vehicle.

An arrangement for fastening the cross supports 4 to the railing tubes 3 and the development of the clamping device is now explained with reference to FIGS. 2 to 6.

Figure 3:
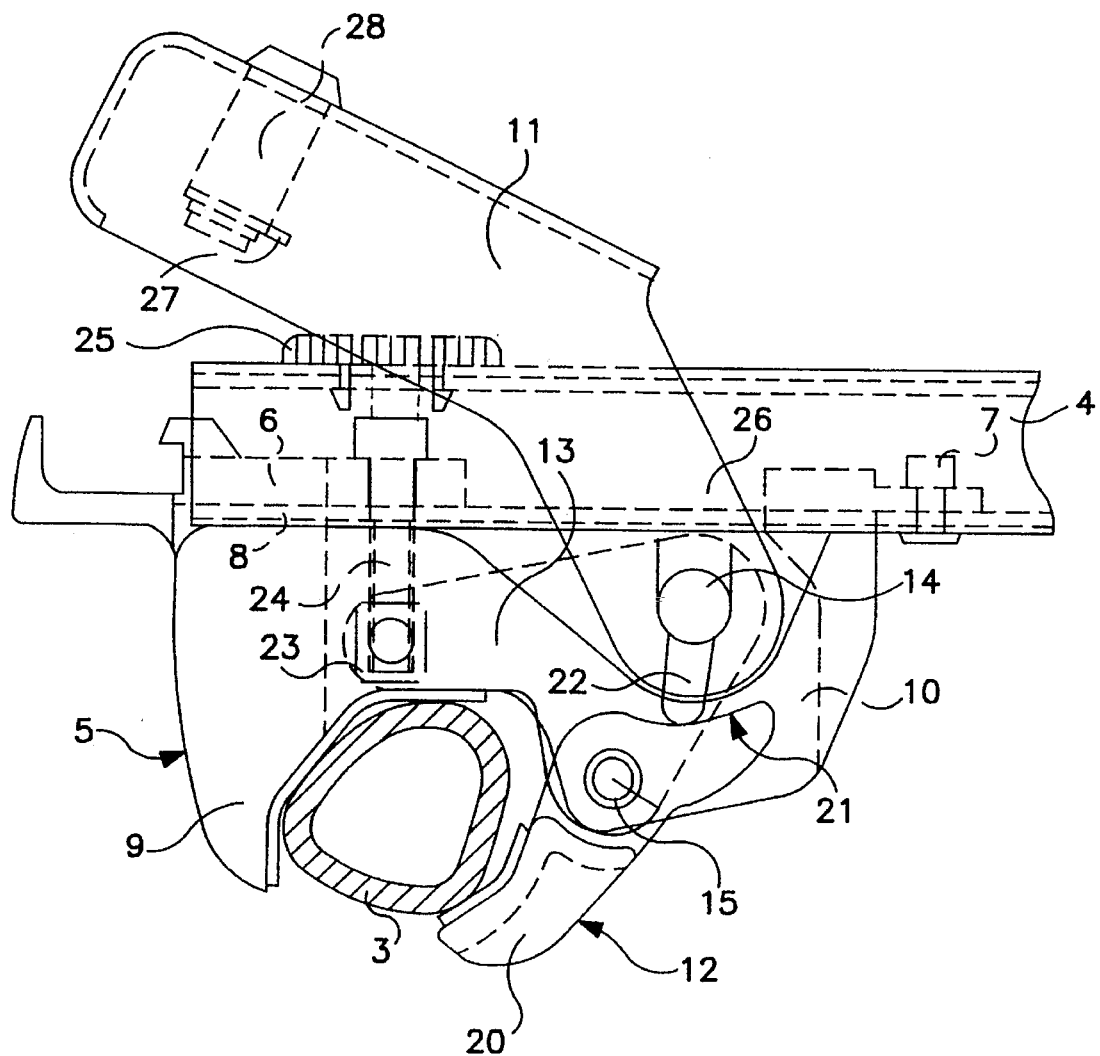
FIG. 3 shows the end region of the cross support with the clamping device in an intermediate position.

The clamping device arranged at each end region of each cross support 4 comprises a base member 5 which is fastened in a suitable manner on the cross support 4. In the embodiment shown, the base member 5 is pushed by its upper body part 6 into the end region of the cross support 4, which is developed as a square cross tube, and is fastened to the cross support 4 by a holding rivet 7. Insertion of the base member 5 is made possible by lateral grooves between the upper and lower regions of the base member and a slot 8 in the lower wall of the cross support (FIG. 3).

The base member 5 is formed integrally with a resting jaw 9 and it is furthermore shaped generally like a housing by a recess 10 which extends from top to bottom through the jaw 9. A clamping jaw 12 and a transmission bracket 13 extend into the recess 10 of the base member 5. A first pivot pin 14 passes through the housing walls of the base member 5. On it are mounted both a swing lever 11 and the transmission bracket 13. An arrangement, which is fixed in rotation is present between the swing lever 11 and the pivot pin 14, while a turnable arrangement is present between the transmission bracket 13 and the pivot pin 14.

A second pivot pin 15 is arranged below the first pivot pin 14 and closer to the resting jaw 9. The clamping jaw 12 is mounted on the pin 15 for swinging. The second pivot pin 15 is parallel to the first pivot pin 14. The pin 15 passes through the transmission bracket 13 and between parallel bracket parts 16 which make up transmission bracket 13 and also serve to guide clamping jaw 12 See FIG. 5.

The resting jaw 9 has resting surfaces 17, 18 and 19. The resting surfaces 17 and 19 extend approximately perpendicular to each other while the resting surface 18 provides an oblique connection between the resting surfaces 17 and 19. A railing tube 3 comes into a supported resting position on, in each case, at least two of the resting surfaces.

The clamping jaw 12 is developed like a double-armed lever which is swingable around the horizontal pivot pin 15. The clamping jaw has a lower lever arm as a yoke 20 and an upper lever arm with an attack surface 21. The surface 21 cooperates with a clamping projection 22 which is connected fixed for rotation with the swing lever 11. The projection 22 is capable of sliding along the attack surface 21 upon actuation of the swing lever. The attack surface 21 is arcuately curved to correspond approximately to the radius of swing of the clamping projection 22, but the surface 21 is developed as a flat spiral. In the embodiment shown, the clamping projection 22 is an integral part of the swing lever 11. The side of the clamping jaw 12 which faces the resting jaw 9 can be applied against a railing tube 3 and can be clamped against the railing tube 3 by swinging of the swing lever 11.

Figure 2:
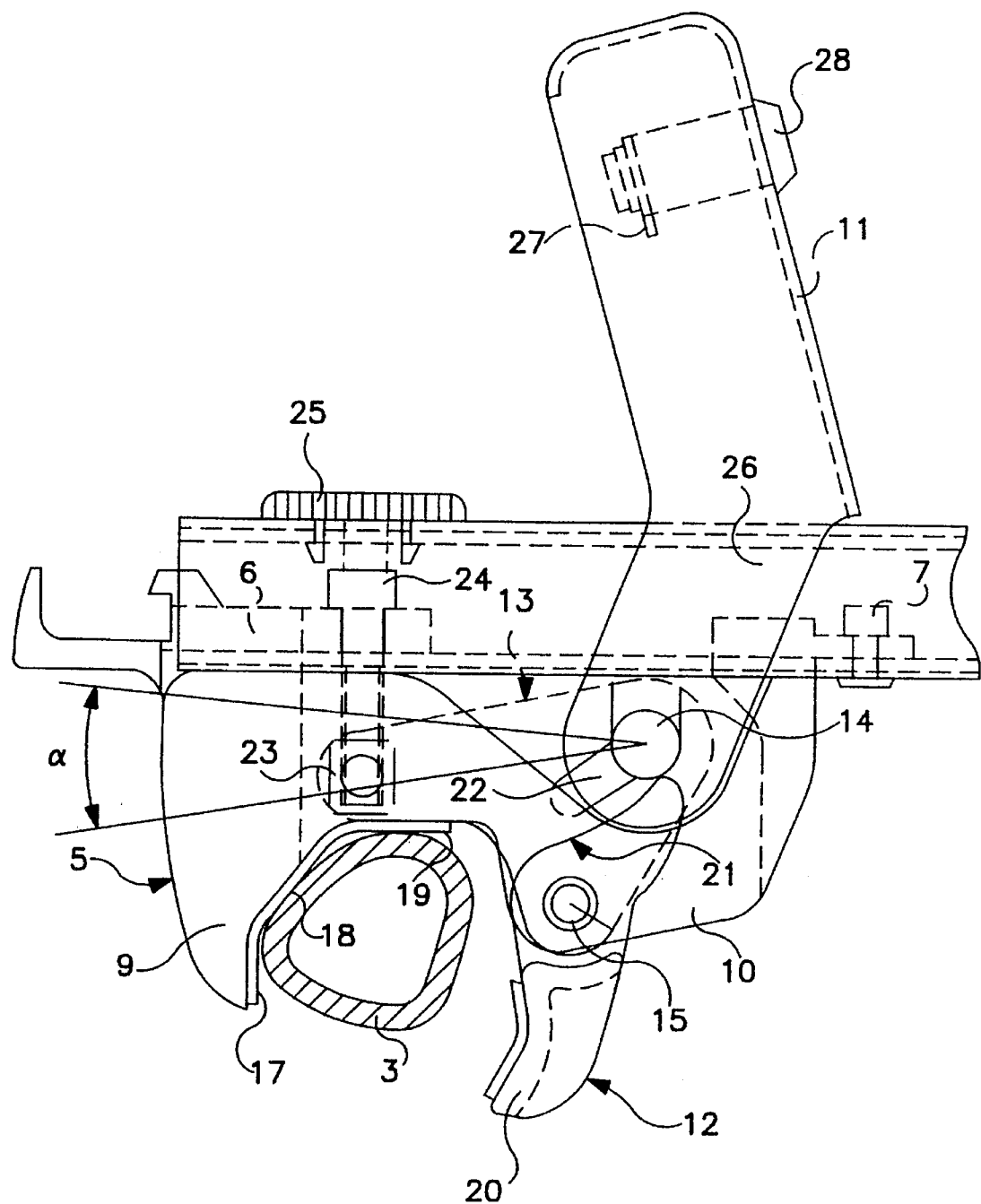
FIG. 2 shows an end region of a cross support, with a clamping device arranged thereon, in an open position.
Figure 6:
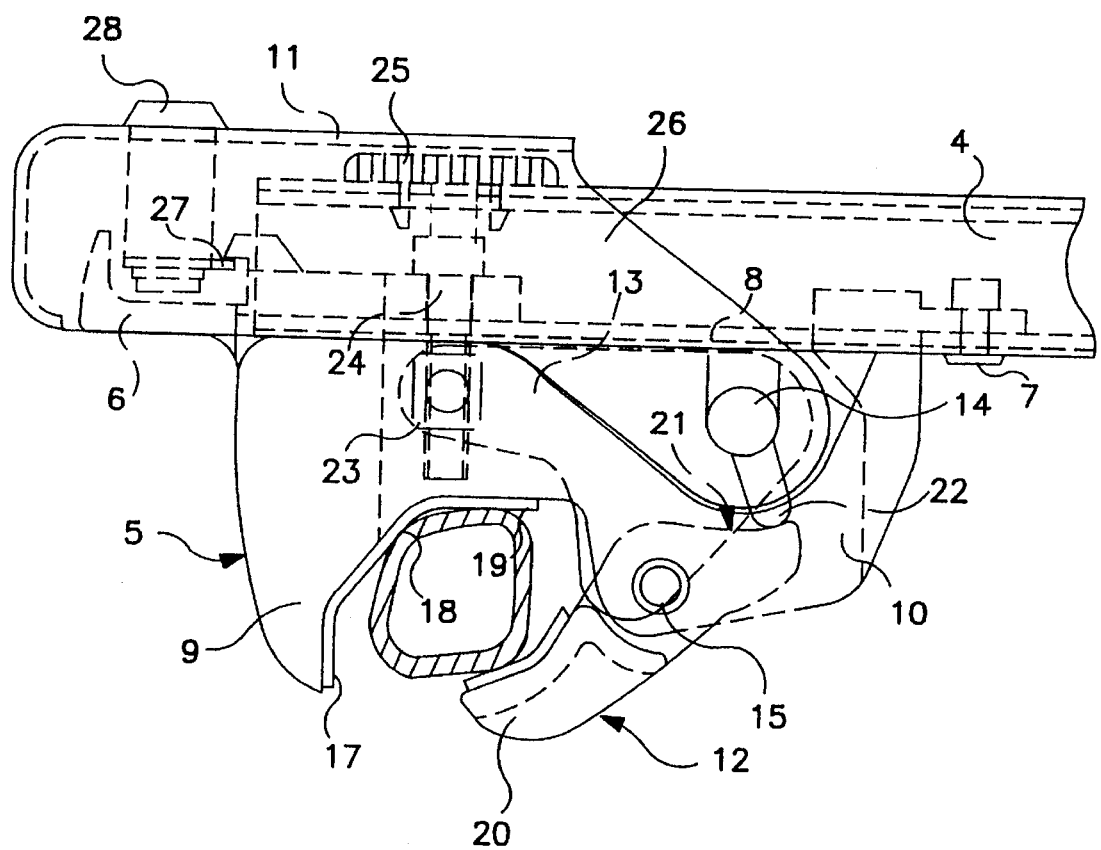
FIG. 6 shows the cross support with the clamping device of FIG. 4 arranged on a railing tube of smaller profile cross section.

The transmission bracket 13 adapts the clamping device to different size and shape railing tubes. Therefore, the transmission bracket is also swingably mounted and, in turn, bears upon the clamping jaw 12. The corresponding position of swing of the transmission bracket 13 can be determined by a setting member which comprises a threaded nut 23 fastened to the transmission bracket 13 and a headed screw 24 guided for longitudinal displacement in the nut 23 and supported to the base member 5. The resulting angle of swing for the transmission bracket 13 is shown in FIG. 2 and designated α. FIG. 2, for example, shows a swing angle of the transmission bracket 13 for a thick railing tube 3, while FIG. 6 shows an angle of swing of the transmission bracket for a thin railing tube 3. In order to facilitate the setting of the basic position in each case, the screw 24 is coupled to a setting knob 25 which is easily accessible from the top of the cross support.

The resting jaw 9 is arranged fixed on the cross support 4 and is on the side of the rail 3 toward the outer side of the vehicle, while the clamping jaw 12 is located on the side of the rail toward the center of the vehicle.

The swing lever 11 has a forked-shaped end region including fork arms 26 (FIGS. 5 and 6) which grip, on the one hand, around the cross support 4 and, on the other hand, around the base member 5 to which they are fastened via the pivot pin 14.

For mounting, the cross support 4 with the clamping devices seated on its end regions is placed on the two railing tubes 3 which extend parallel to each other on the roof. By swinging or depressing the swing lever 11, the clamping projection 22 comes against the attack surface 21 of the clamping jaw 12, to swing the jaw 12 clockwise in FIG. 2, against the corresponding railing tube 3, initially up into a pre-clamped position shown in FIG. 3. In this pre-clamped position, the correct position of the cross supports 4, which are capable of being placed in any desired position along the length of the railing tube 3, can be checked. Completely depressing the swing lever 11 establishes the final fastening of the cross support on the railing tubes 3 as the clamping projection 22 has to overcome a rise of the spirally-curved attack surface 21. Upon the swinging movement, the clamping projection 22 swings counter clockwise and it passes beyond the dead center line between the pivot pins 14 and 15. This prevents loosening of the clamping device by itself.

Furthermore, the swing lever 11 is fastened on the base member 5 by the locking bolt 27 (FIGS. 2, 3 and 6) of a cylinder lock 28 which is arranged on the swing lever 11. This measure also serves as an antitheft device.

Figure 4:
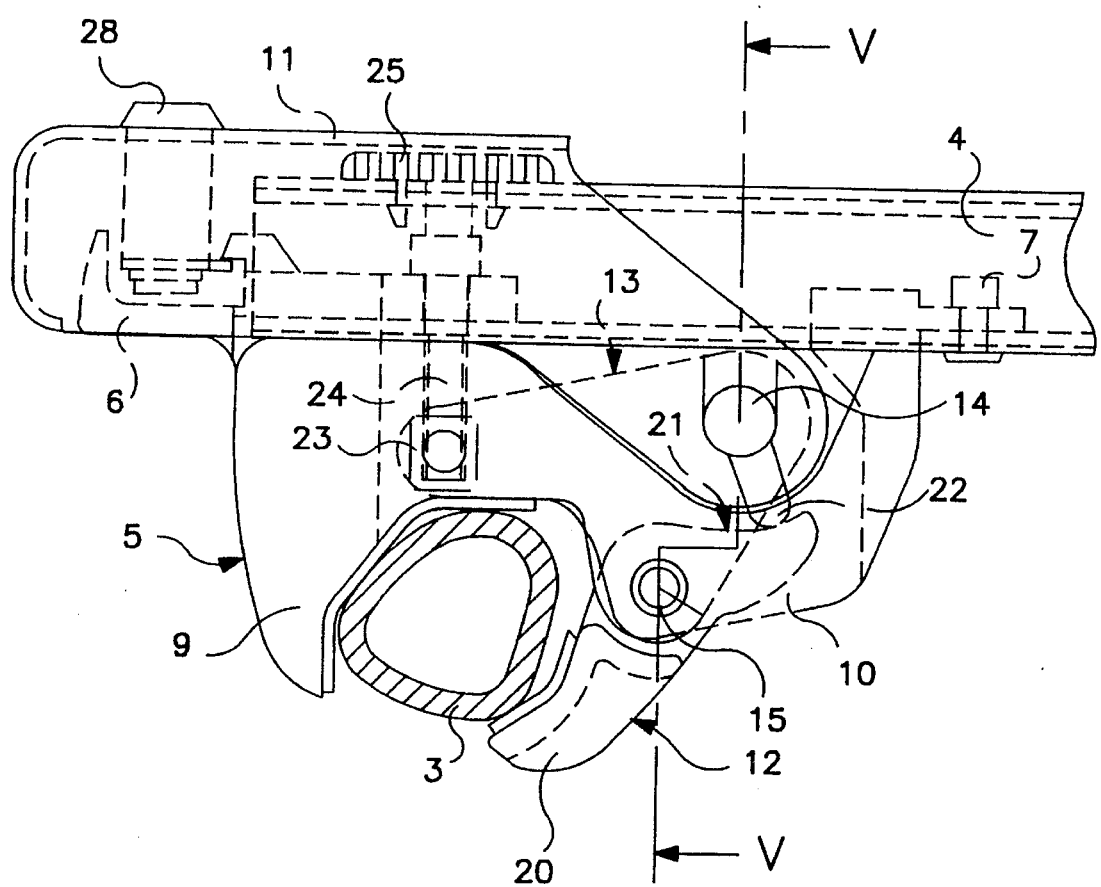
FIG. 4 shows the end region of the cross support with the clamping device in a closed position.
Figure 5:
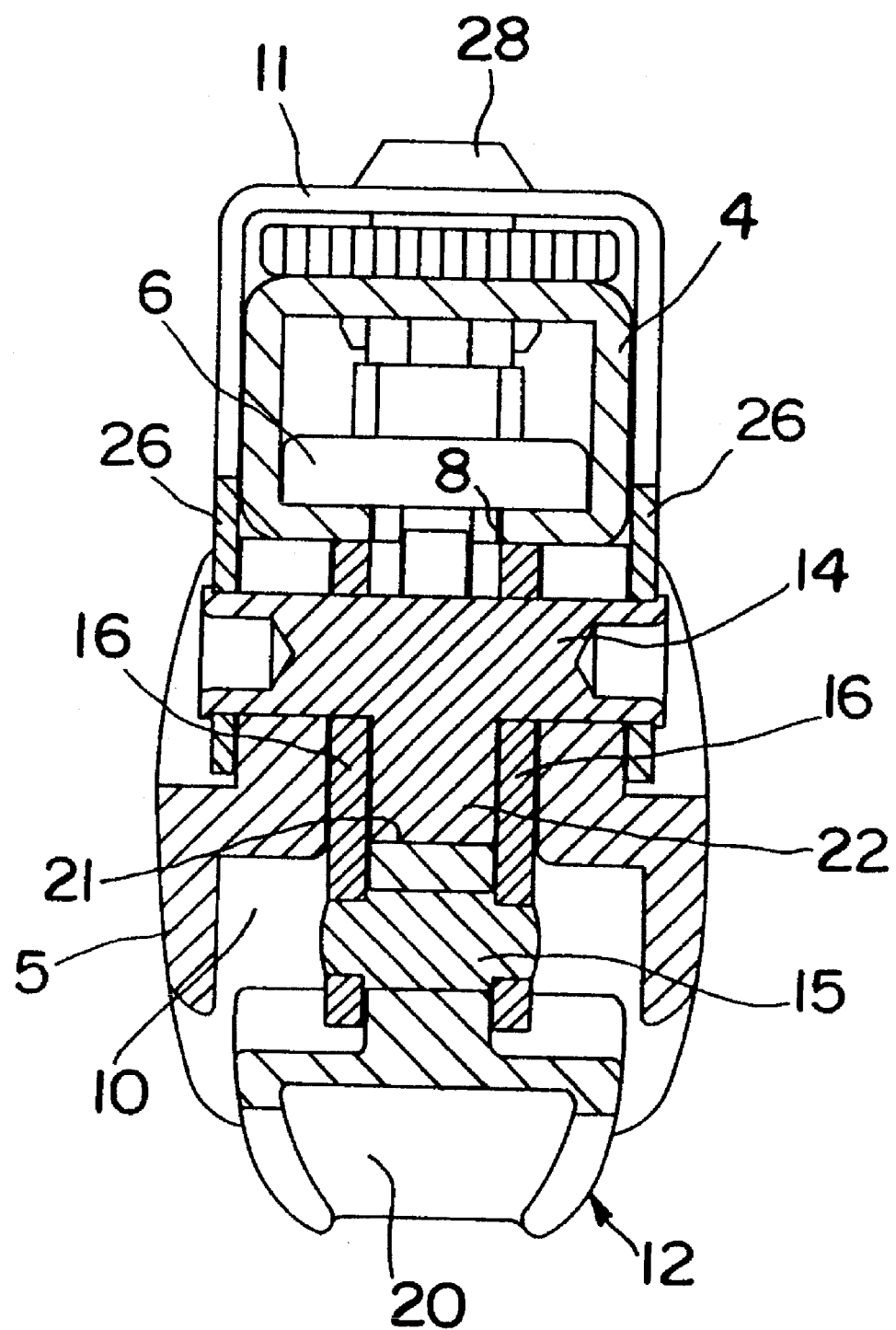
FIG. 5 is a section approximately along the line V—V of FIG. 4.

The clamping opening between the resting jaw 9 and the clamping jaw 12 is variable for adaptation to different thicknesses of railing tubes 3. FIGS. 2 and 4 show a relatively thick railing tube 3 and FIG. 6 a relatively thin one. The swingable arrangement of the transmission bracket 13 and the displacement members including threaded nut 23, screw 24 and possibly setting knob 25, serves this purpose. The adjustment range extends over the angle of swing e shown in FIG. 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cross support for cooperating with a pair of roof rails on the roof of a motor vehicle, the cross support comprising:

a support for extending between said rails; and a clamping device disposed on the support for attaching the support to at least one of the roof rails, the clamping device including:

a base member;

a resting jaw disposed on the base member for clamping against one side of the at least one rail;

a clamping jaw having upper and lower arms and supported on the base member pivotally between the upper and lower arms such that the lower arm is movable relative to the resting jaw, the upper arm including an attack surface, and the lower arm of the clamping jaw including a yoke for engaging a second side of the at least one rail and being opposed to the resting jaw, such that clamping by the resting jaw and the yoke of the clamping jaw onto the at least one rail holds the support to the rail; and a swing lever swingably mounted on the base member and swingable between a first position in which the swing lever engages the upper arm of the clamping jaw whereby the yoke of the clamping jaw pivotally engages the second side of the at least one rail and is held thereto and a second position in which the yoke is not held against the at least one rail, by relative movement of the swing lever with respect to the clamping jaw for locking the yoke on the lower arm of the clamping jaw in a clamped position against the at least one rail.

2. The cross support of claim 1, wherein the swing lever is a manually operable lever including manually engageable means for moving the swing lever between the positions thereof.

3. The cross support of claim 1, wherein the yoke of the clamping jaw is curved so as to partially surround the at least one rail.

4. The cross support of claim 1, wherein said support having opposing end portions and one of the clamping devices is provided on each of said end portions for clamping each of said end portions to the pair of rails, respectively.

5. The cross support of claim 1, further comprising:

a pivot for pivotally supporting said clamping jaw to said base member; and a clamping projection disposed on the swing lever for engaging the attack surface on the upper arm of the clamping jaw and sliding along the attack surface as the swing lever is swung between the positions thereof, such that the clamping projection in engagement with the attack surface after the swing lever has been swung to the first position thereof locks the yoke against the at least one rail.

6. The cross support of claim 5, further comprising a pivot for the swing lever disposed on the base member for mounting the swing lever for the relative movement with respect to the clamping jaw.

7. The cross support of claim 6, wherein the attack surface of the upper arm of the clamping jaw has a generally arcuate shape approximately corresponding to a swing radius of the clamping projection of the swing lever.

8. The cross support of claim 7, wherein the attack surface has a generally spiral curvature.

9. The cross support of claim 6, wherein the pivots for the clamping jaw and the swing lever comprise pins, the pins being spaced apart from each other and their central axis being parallel to each other.

10. The cross support of claim 6, further comprising a transmission bracket pivotally mounted on the pivot for the swing lever, the transmission bracket being pivotable with respect to the swing lever, and having an adjustable pivot position, the transmission bracket being further engageable with the clamping jaw such that adjustment of the pivot position of the transmission bracket determines an initial position of the clamping jaw with respect to the resting jaw before operation of the swinging lever swings the clamping jaw toward the resting jaw.

11. The cross support of claim 10, further comprising means for setting the pivot position of the transmission bracket.

12. The cross support of claim 11, wherein the means for setting the pivot position comprises:

a threaded nut on the transmission bracket; and a screw disposed on the base member and displaceable by rotation with respect to the nut.

13. The cross support of claim 12, further comprising a grippable setting knob disposed on the support and coupled for driving the screw such that rotation of the knob rotates the screw for setting the pivot position of the transmission bracket.

14. The cross support of claim 1, further comprising means for locking the swing lever to the base member for preventing removal of the clamping device from the roof rail.

15. The cross support of claim 1, wherein the clamping device is detachable from the support.

16. The cross support of claim 1, wherein the resting jaw is formed integrally with the base member.

17. A clamping device adapted to be disposed on a cross support for clamping the cross support to a roof rail on the roof of a motor vehicle, the clamping device comprising:

a base member;

a resting jaw disposed on the base member for clamping against one side of the rail;

a clamping jaw having upper and lower arms and pivotally supported by the base member between the upper and lower arms such that the lower arm is movable relative to the resting jaw, the upper arm including an attack surface, and the lower arm of the clamping jaw including a yoke for engaging a second side of the rail, such that clamping by the resting jaw and the yoke of the clamping jaw onto the rail holds the support to the rail; and a swing lever swingably mounted on the base member and swingable between a first position in which the swing lever engages the upper arm of the clamping jaw whereby the yoke of the clamping jaw pivotally engages the rail and is held thereto, and a second position in which the yoke is not held against the rail, the swing lever including a clamping projection thereon for engaging the attack surface of the upper arm of the clamping jaw and sliding along the attack surface as the swing lever is swung between the positions thereof, such that the clamping projection engages with the attack surface after the swing lever has been swung to the first position thereof for locking the yoke on the lower arm of the clamping jaw in a clamped position against the rail.

18. The cross support of claim 17, further comprising a transmission bracket pivotally mounted on the base member and pivotable with respect to the swing lever, the transmission bracket having an adjustable pivot position and being engageable with the clamping jaw such that adjustment of the pivot position of the transmission bracket determines an initial position of the clamping jaw with respect to the resting jaw before operation of the swinging lever swings the clamping jaw toward the resting jaw.

19. The cross support of claim 17, wherein the yoke on the lower arm of the clamping jaw is curved so as to partially surround the rail.

20. The cross support of claim 12, wherein the resting jaw is formed integrally with the base member.

* * * * *